July 30, 1940.  R. HILL  2,209,886
INSIDE CONTROL HOOD LATCH
Filed Feb. 17, 1939  7 Sheets-Sheet 1
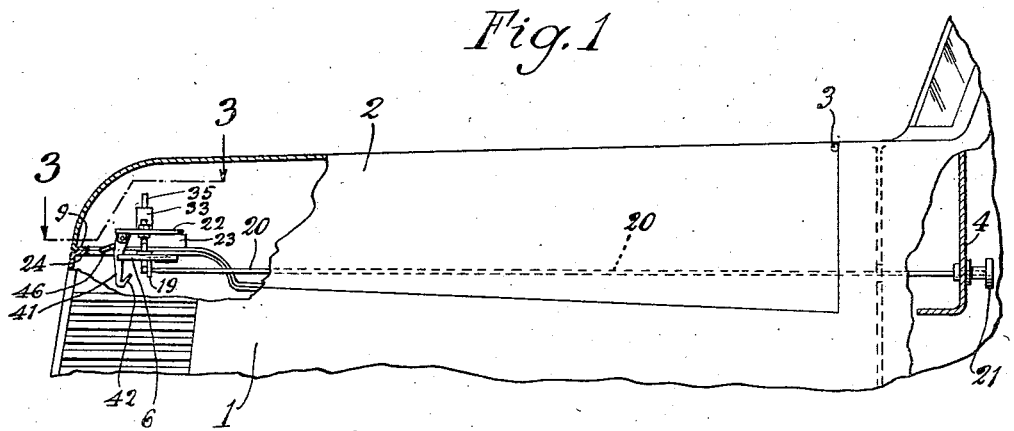
Inventor
Rowland Hill
by Parker + Carter
Attorneys July 30, 1940. R. HILL 2,209,886
INSIDE CONTROL HOOD LATCH
Filed Feb. 17, 1939 7 Sheets-Sheet 2
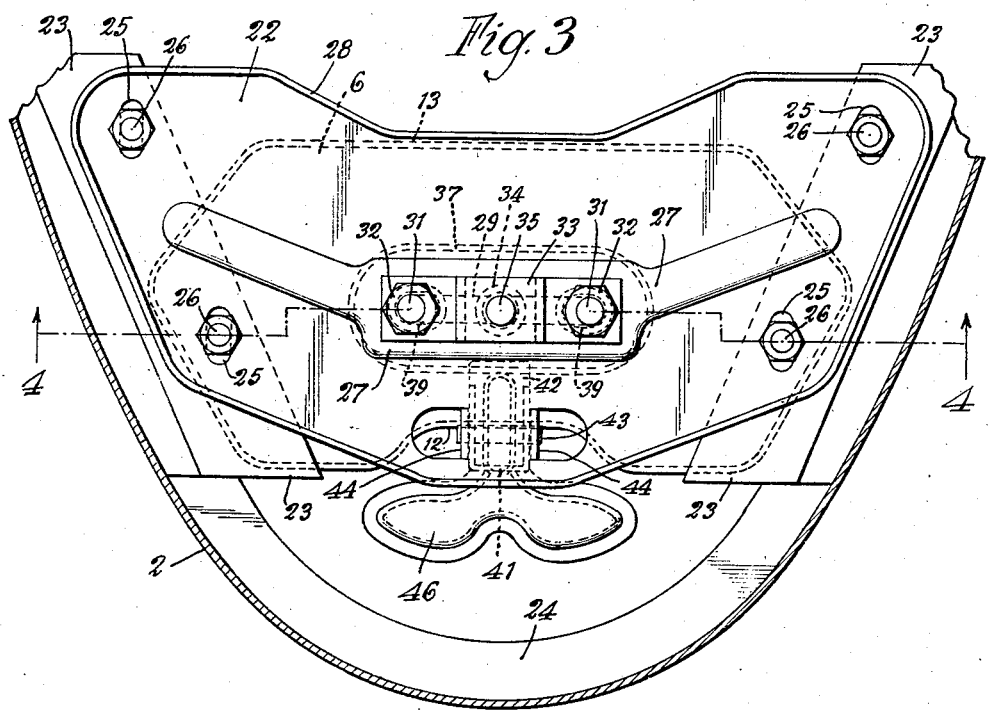
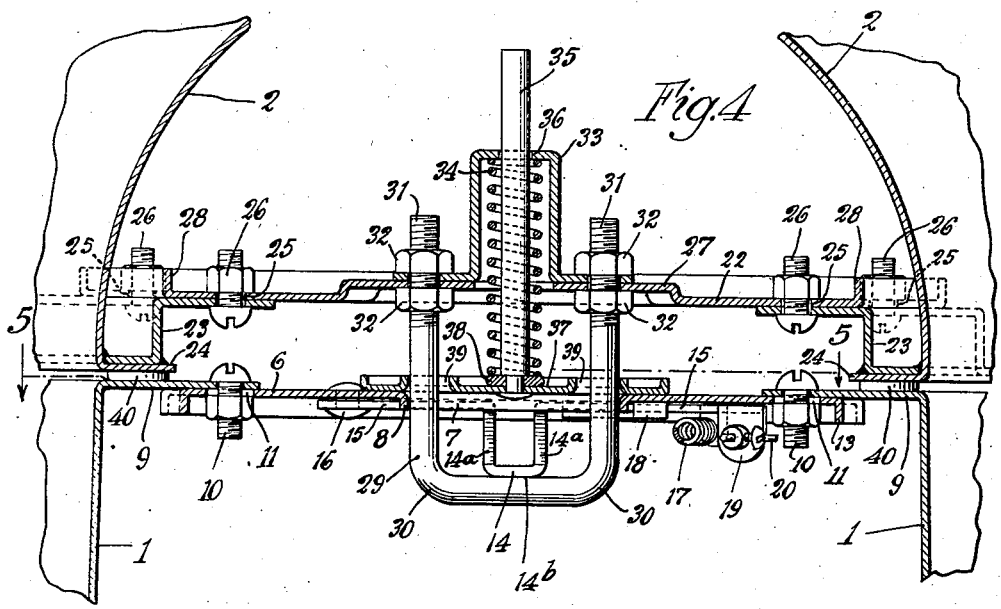
Inventor
Rowland Hill
by Parker + Carter
Attorneys July 30, 1940.　　　　　R. HILL　　　　　2,209,886
INSIDE CONTROL HOOD LATCH
Filed Feb. 17, 1939　　　7 Sheets-Sheet 3

Inventor
Rowland Hill
by Parker + Carter.
Attorneys.

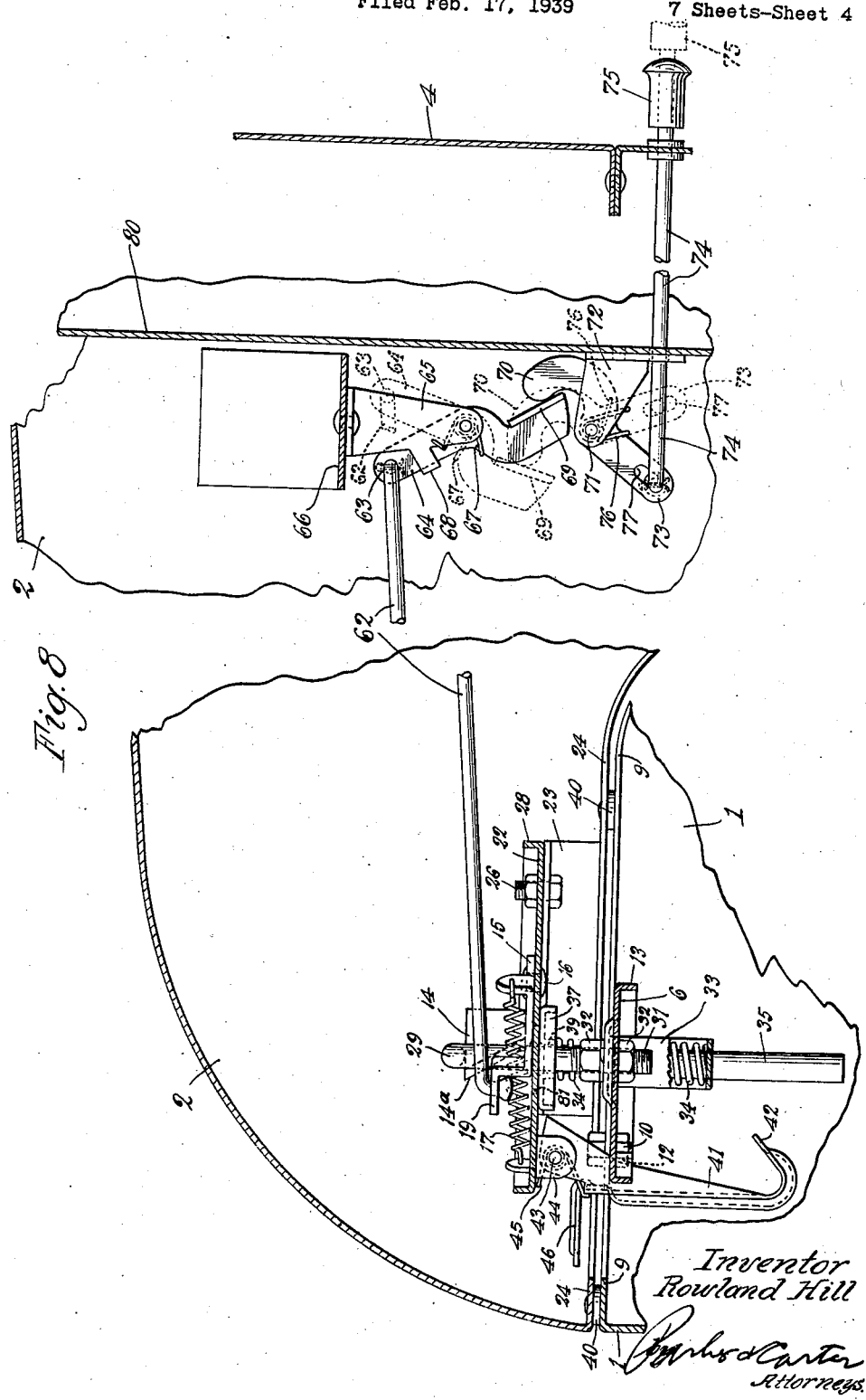

July 30, 1940.   R. HILL   2,209,886
INSIDE CONTROL HOOD LATCH
Filed Feb. 17, 1939   7 Sheets-Sheet 5
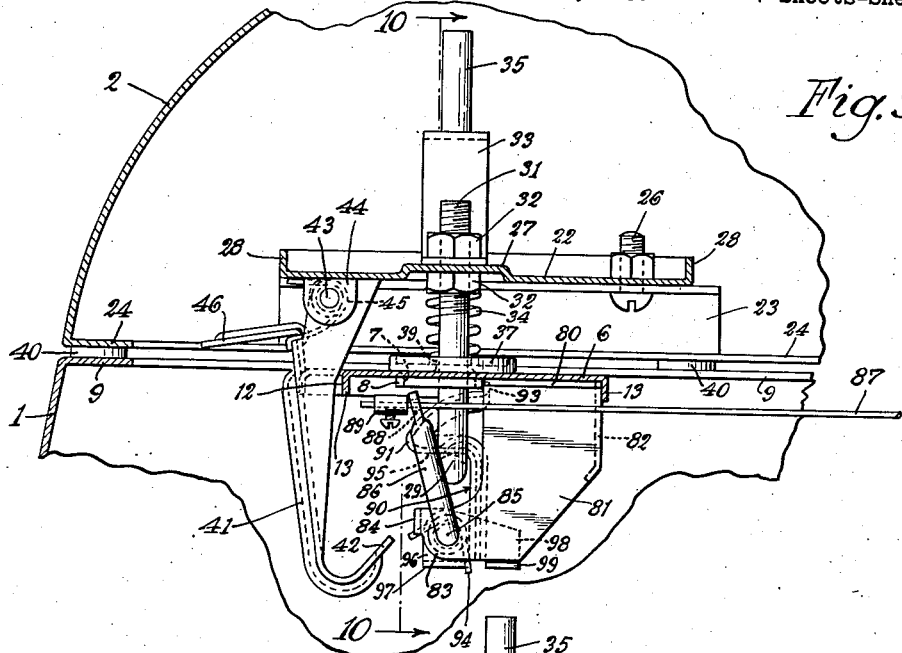
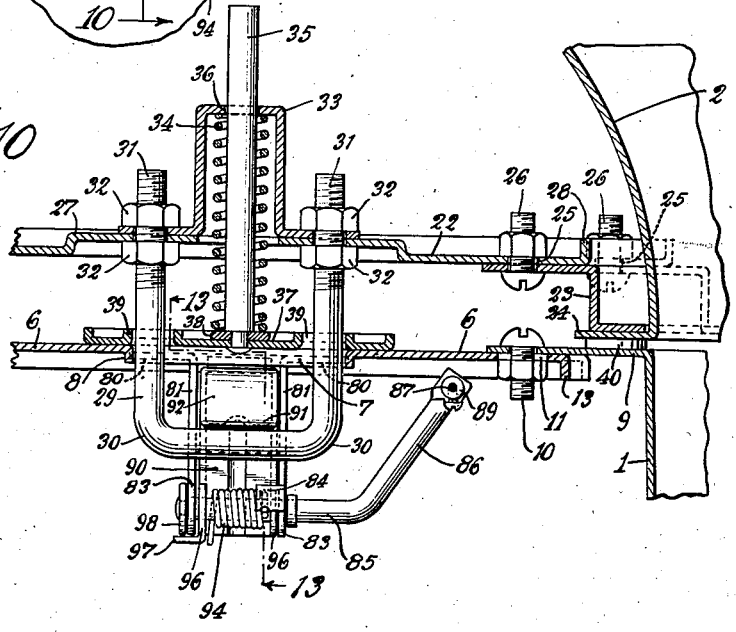
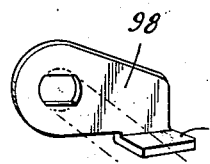
Inventor
Rowland Hill
by Parker Hauter
Attorneys.

July 30, 1940.  R. HILL  2,209,886
INSIDE CONTROL HOOD LATCH
Filed Feb. 17, 1939  7 Sheets-Sheet 6
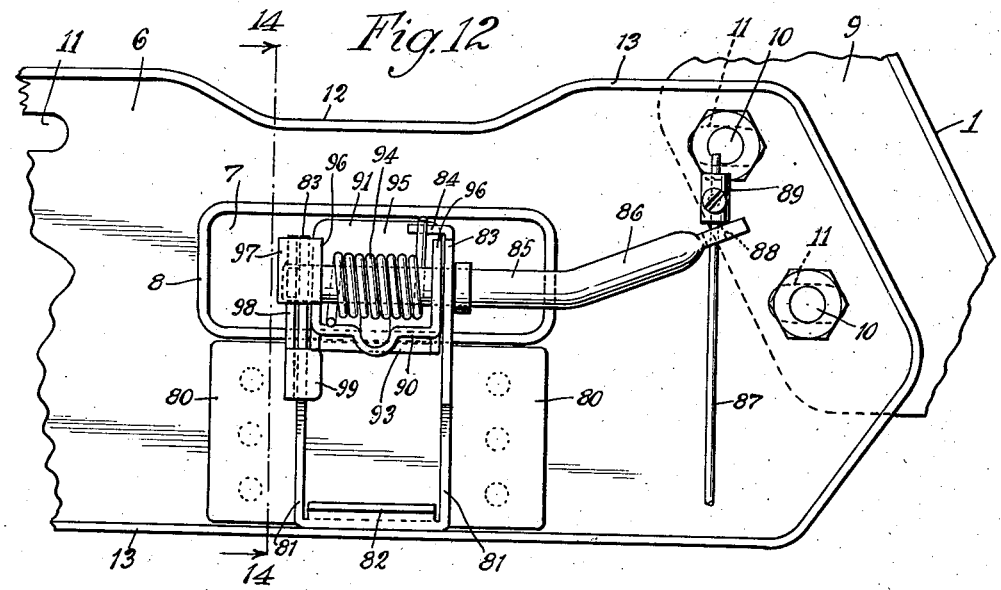
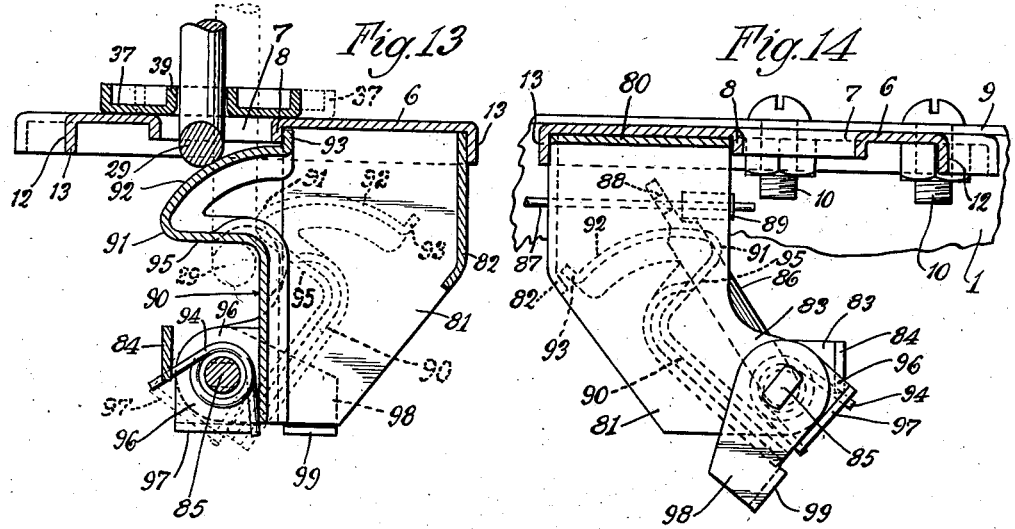
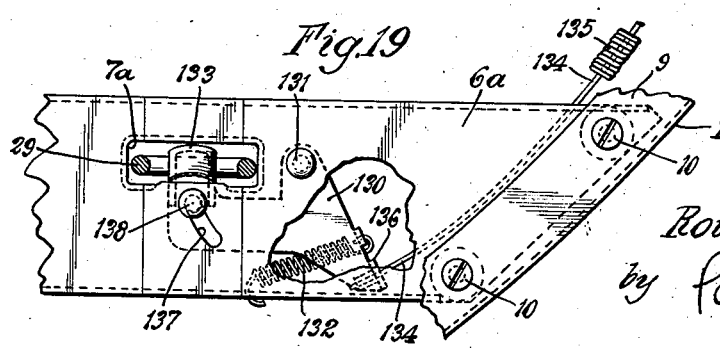
Inventor
Rowland Hill
by Parker & Carter
Attorneys

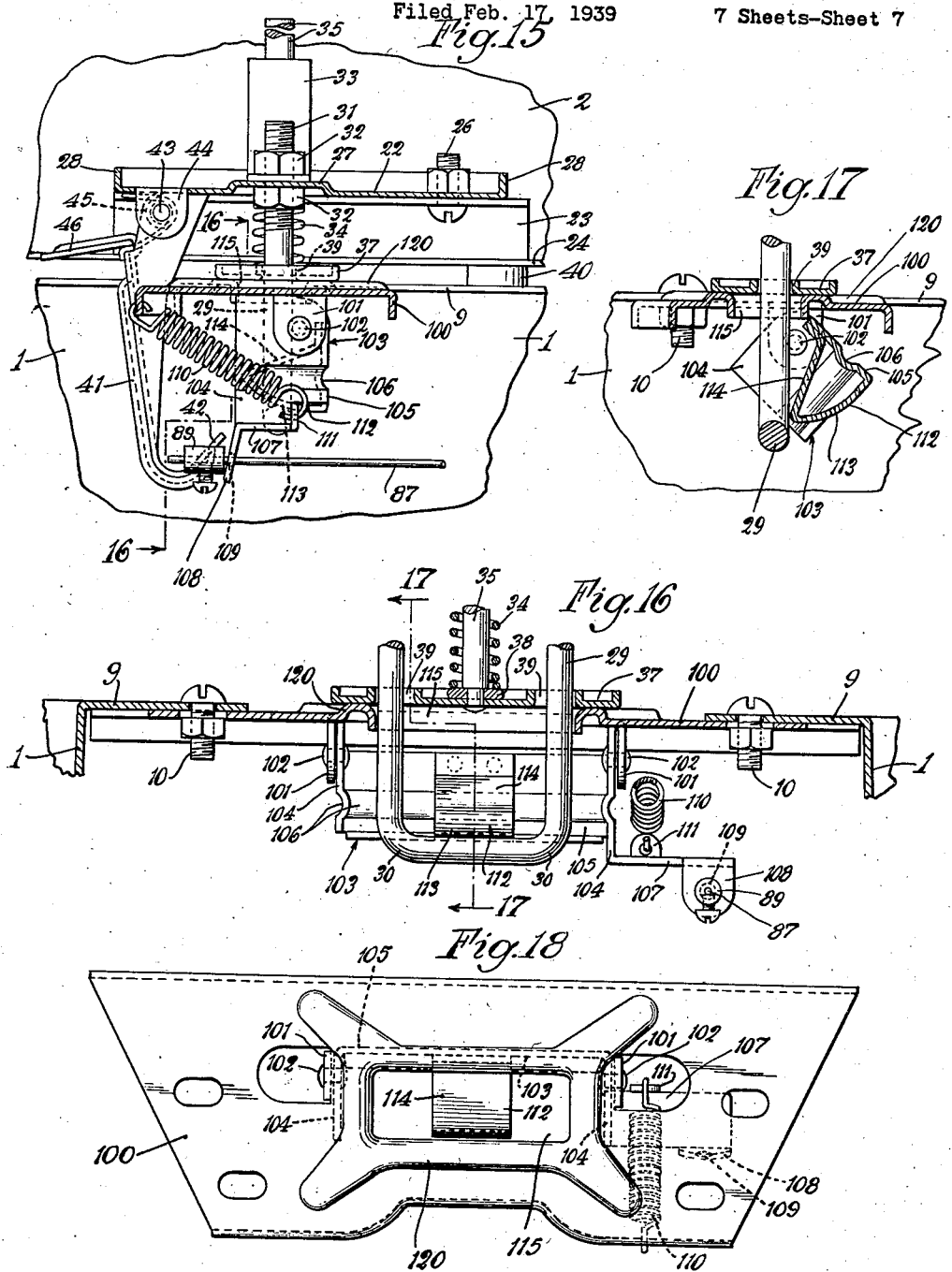

Patented July 30, 1940

2,209,886

UNITED STATES PATENT OFFICE 2,209,886

INSIDE CONTROL HOOD LATCH

Rowland Hill, Chicago, Ill., assignor to Chicago Forging & Manufacturing Company, Chicago, Ill., a corporation of Illinois Application February 17, 1939, Serial No. 256,965

15 Claims. (Cl. 292—221)

My invention relates to an improvement in latches and has for one purpose the provision of an improved latch for the closure of an automobile hood.

Another purpose is the provision of a latch assembly which shall be compact, easy to manufacture, and efficient in use.

Another purpose is the provision of means unitarily applicable to an automobile hood and hood closure having primary latching means, secondary safety latching means, and means for lifting the hood closure a predetermined distance in response to release of the primary latching means and prior to the release of the secondary safety latching means.

Another purpose is the provision of remote control latch means in which a latch, normally spring thrust into latching position, may move out of latching position to permit the keeper to drop into closed position, without affecting the remote control mechanism.

Other purposes will appear from time to time in the course of the specification and claims.

I illustrate my invention more or less diagrammatically in the accompanying drawings wherein:

Fig. 1 is a side elevation with parts in vertical longitudinal section;

Fig. 2 is a vertical longitudinal section on an enlarged scale illustrating part of the material shown in Fig. 1;

Fig. 3 is a section on the line 3—3 of Fig. 1;

Fig. 4 is a section on the line 4—4 of Fig. 3;

Fig. 5 is a section on the line 5—5 of Fig. 4;

Fig. 8 is a vertical longitudinal section of a further modified form;

Fig. 9 is a vertical longitudinal section through a variant form of my device;

Fig. 10 is a section on the line 10—10 of Fig. 9;

Fig. 11 is a detail;

Fig. 12 is a partial bottom plan view of a portion of the device;

Fig. 13 is a section on the line 13—13 of Fig. 10;

Fig. 14 is a section on the line 14—14 of Fig. 12 with parts in different position;

Fig. 15 is a view similar to Fig. 9 of a variant form;

Fig. 16 is a section on the line 16—16 of Fig. 15;

Fig. 17 is a section on the line 17—17 of Fig. 16, with the parts in a different position;

Fig. 18 is a plan view of the supporting plate and associated parts of Fig. 16; and Fig. 19 is a partial plan view of a variant form of latch.

Like parts are indicated by like characters throughout the specification and drawings.

Figure 6:
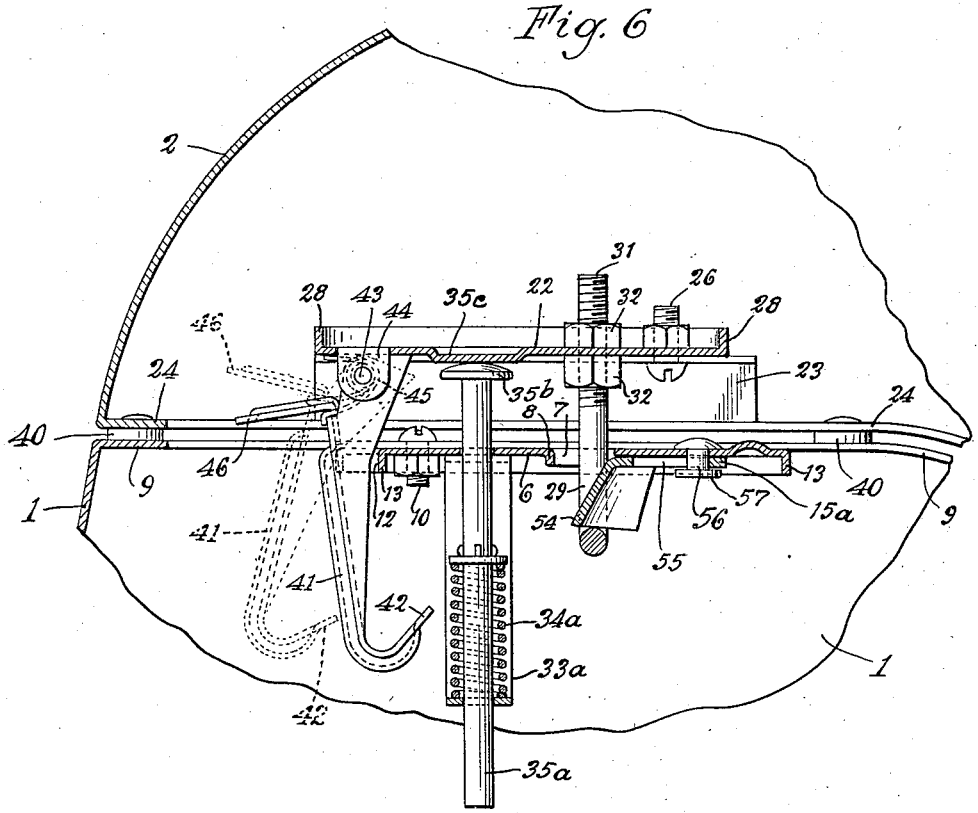
Fig. 6 is a section similar to that of Fig. 2 of a variant form.

Referring to the drawings, and for example to Fig. 1 and following, 1 generally indicates an automobile hood and 2 a closure therefor, transversely and horizontally hinged at its rear end as at 3. It will be understood, however, that the hinge shown is diagrammatic and that any suitable mounting for the rear end of the closure 2 may be employed. 4 generally indicates the instrument panel of the vehicle.

Mounted on the hood 1 is a member which I may call a bottom plate, generally indicated at 6 and shown in some detail for example in Fig. 5. It is illustrated as having a transversely elongated aperture 7 surrounded by a downwardly turned flange 8. The plate 6 may be mounted in any suitable fashion upon the hood 1. I illustrate for example flanges 9 at each side of the hood 1 to which the plate 6 may be secured by bolts 10 or by any other suitable securing means.

Any suitable adjusting slots may be provided on the plate 6, as shown for example at 11 in Fig. 5. Preferably the plate 6 is mounted for lateral adjustment, the slots 11 being laterally or transversely elongated, whereby the aperture 7 may be alined with the latching means below described. 12 indicates any suitable securing lip provided with a downwardly turned flange 13 adapted to receive the secondary or safety latching member below described. The flange 13, it will be understood, may extend entirely around or substantially around the plate 6.

Mounted on the lower side of the plate 6 I illustrate a latch member 14 shown as formed of sheet metal and mounted on or forming part of a lever 15 pivoted as at 16 for rotation about a vertical pivot and urged by a spring 17 toward latching position. 18 is any suitable retaining member for the lever 15 which may be secured to the bottom of the plate 6. 19 is a downwardly projecting lug on the end of the lever 15 which is adapted to receive any suitable operating element or rod 20 which terminates in any suitable operating handle member diagrammatically shown at 21. The member 21 may be mounted on or adjacent the instrument panel 4 of the vehicle, in a position convenient to the driver's seat.

22 indicates a transversely extending plate mounted on the hood closure 2, for example upon intermediate brackets 23 secured upon the inturned lower edges or flanges 24 of the hood closure 2. It will be understood, of course, that any suitable securing and supporting means may be employed. I illustrate the member 22 as mounted for longitudinal adjustment and for that purpose I provide adjusting slots 25 through which pass any suitable securing bolts 26 whereby the member 22 is secured upon the upper inner flanges of the brackets 23. The transversely extending member 22 is upwardly offset as at 27, which offset may serve as a reinforcing means and is not in general essential. It is also provided with a circumferential reinforcing flange 28, shown as upwardly extending.

Mounted on the upwardly offset central portion 27 is a combined centering and locking yoke or keeper 29 which may for example be formed of rod stock and which has curved or beveled corners 30. The upper ends of each arm may be screw-threaded as at 31 to receive adjusting and locking nuts 32. Mounted upon the ends 31 and secured in position by said locking nuts is a spring yoke 33 in which is positioned a coil compression spring 34 through which passes the pin 35, the end of which extends upwardly through the aperture 36 in the upper end of the yoke or guide 33. To the lower end of the pin 35 is secured a plate 37 and a washer 38 which serves as a lower abutment for the spring 34. The plate 37 is slotted as at 39 to permit the passage therethrough of the arms of the yoke 29 and is of sufficient size to abut normally against portions of the upper face of the transversely extending lower plate 6, as shown for example in Fig. 4.

Any suitable pads or cushioning members of rubber or the like, as shown at 40, may be employed for cushioning the contact between the opposed portions of the hood 1 and the hood closure 2.

I provide a secondary or safety latching means which includes a lever or hook 41 with a latching or hook portion proper 42. The hook member is pivoted as at 43 between ears 44 which may be downwardly struck from the upper transverse plate 22. Any suitable means may be employed for urging the hook 42 normally into vertical alinement with the securing lip 12. I illustrate for example a coil spring 45. The hook is provided also with a finger or handle piece 46, preferably formed integrally therewith, the purpose of which will later appear.

Figure 7:
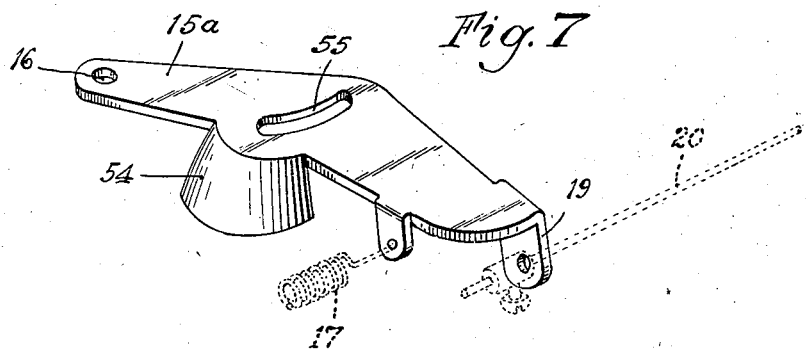
Fig. 7 is a perspective view of the latch.

Referring to Figs. 6 and 7, a slight change is made over the form of Figs. 1 and following. Referring to Fig. 2, it will be noted that the latch 14 has a beveled forward face or edges 14a which permit the yoke 29 to override it when the closure 2 is dropped into closed position. It will be noted also that the lower face 14b of the member 14 is somewhat inclined in relation to the path of movement of the member 14 as a whole. The inclination may amount, for example, to about three degrees.

In the form of Figs. 6 and 7, in the place of the box-shaped latch 14 I provide a rounded apron 54 over which the yoke 29 may ride. A guide slot 55 is employed, through which a guide pin 56 passes, the guide pin 56 having a large retaining head 57 whereby the latch generally indicated as 15a is held in its proper horizontal position. In the form of Fig. 6 I also mount the pin 35a, which corresponds to the pin 35 of Fig. 4, on the lower plate 6 and provide a yoke 33a therefor which receives the compression spring 34a.

The pin 35a is provided with a head 35b which abuts against the bottom of the upper plate 22. Any suitable reinforcement, for example the raised portion 35c, may be alined therewith to prevent bending of the plate 22.

Referring to the form of Fig. 8, I illustrate a structure which is basically similar as to latching means to Fig. 2 but in which the latch 15 is positioned on the upper plate 22 instead of the lower plate 6. This puts the control member 62 corresponding to the member 20 on the closure 2. However, since the closure 2 is raised and lowered, it is in this form impossible to employ the 15 member 20 extending directly from the latch to the instrument panel 4. I therefore employ a member 62 on the closure 2 which is secured at its rear end as at 63 to a lever 64 pivoted on a bracket 65 on any suitable transverse support 66 secured to the closure 2. The spring 67 serves to bias it to engagement with an abutment 68 associated with the bracket 65.

The lower arm of the lever is provided with a contact portion or plate 69 opposed to the U-shaped lever 70 which is pivoted as at 71 on a bracket 72 mounted on the cowl 80 of the vehicle. 73 is an additional arm of the lever which has secured to it the actuating rod 74 which terminates in the operating handle 75 located adjacent the instrument panel 4. 76 is any suitable spring for biasing the U-shaped member 70 into contact with the member 69. The connection between the arm 73 and the rod 74 may include a slot 77.

It will be understood that in the operation of this form of the device, when the closure 2 is in the closed position, the parts are in the position shown in full line in Fig. 8. The operator, by pulling inwardly on the handle 75, can withdraw the latch 15 from latching position, through the action of the levers 64 and 70, as illustrated in dotted lines. However, this lever connection is effective to permit the closure 2 to be raised and lowered, and it resumes its ready position when the closure is fully lowered and relocked.

With reference to the latching means of Fig. 8, note that the upper plate 22 is provided with an aperture 81, indicated in dotted line, corresponding to the aperture 7 in the plate 6 of the device shown in Figs. 2 and 5.

Referring to Fig. 9 and following, I illustrate a variant form of latch. Except for the latch itself and its associated parts, the structure is substantially identical with the structures shown, for example, in Figs. 2 and 4, and identical parts are identically numbered in the two sets of drawings. Mounted on the bottom of the plate 6 is a bracket which includes flanges 80, opposed to the lower face of the plate 6, and parallel downwardly extending side plates 81 connected at their rear by a portion 82. The bracket is made of sheet metal and may be stamped from one piece.

Each side plate 81 has a forwardly extending ear 83, and one of said ears is provided with an offset lug or abutment portion 84. Pivoted in the ears 83 is a shaft 85, having an offset or crank portion 86, which may be secured to any suitable longitudinal extending control member 87, and thereby to any hand piece or control piece not herein shown but corresponding to, or identical with the member 21 of Fig. 1.

It will be noted that the member 87 passes through an aperture 88 in the crank 86. Member 89 is an adjustable stop on the member 87.

Pivoted upon the shaft 85, within the side plate members 81, is the latch member proper, which I indicate generally as 90. It may also be struck out of sheet metal and includes a nose 91 having an upward curved or inclined face 92. Formed integral with it is a stop 93 which abuts against the lip 8 of the plate 6 and is yieldingly thrusted thereagainst as by the coil spring 94, one end of which abuts against the stop 84, and the other against a portion of the latch 90.

95 indicates a flat locking portion associated with or forming part of the nose 91. One of the ears 96 of the latch has an offset or lug 97 thereon which normally engages a lever 98, which is mounted on and held against rotation in relation to the shaft 85. The spring 94 is normally effective to hold the latch parts in the position in which they are shown in Fig. 9, with the latch nose 91 in locking position. The parts are shown also in Fig. 13 in full line. Normally, in response to a pull on the control member 87, the above described latch parts move as a unit, and the latch is withdrawn from the full line position of Fig. 13 to the position of Fig. 14. It may happen, however, that the operator, having the closure 2 in raised position, wishes to drop it into closed position. As it is dropped, and in response either to a positive downward thrust or to the weight of the closure, the yoke or keeper 29 strikes the inclined or curved surface 92 of the latch and forces it into the dotted line position of Fig. 13 until the yoke 29 has over-ridden the end of the nose 91. Thereafter the spring 94 will be effective to return the latch to the full line position of Fig. 13, the yoke 29 then being in the dotted line position of Fig. 13 and locked against the horizontal face 95 of the latch nose.

The inward movement of the latch nose is limited by the engagement of the lug 93 and the flange 8, as shown in Fig. 13. The retrograde movement of the latch structure is limited by the lower edge of the plate portion 82, as shown in Fig. 14.

It will be observed, as shown in the variation as illustrated in Fig. 13 between the full and dotted line positions of the member 29, that there is a lateral movement of the keeper and of the thrust member 37 which rides on it. This takes place in the event a compound hinge or extra lever member is employed for pivoting the closure 2. It is understood, of course, that the same latch is applicable where a simple pivot is shown, as at 3 in Fig. 1, in which case there will be little, if any, lateral movement of the member 29 and its associated parts.

Since the latch is pivoted in relation to the shaft 85, I provide further limit means for limiting the rotation of the shaft itself. I illustrate, for example, a lug 99 which forms part of the lever 98 and which is normally thrust by the spring 94 into contact with the outer edge of one of the side plate members 81.

Referring to the form of Figs. 15 and following, the upper plate and the associated parts, mounted on the hood closure, are the same as shown in Fig. 9 and are provided with similar indicating numerals and are not additionally described here.

100 indicates the laterally adjustable bottom plate, mounted in any suitable manner on the hood, for example, on the side members 1, with their laterally extending flanges 9. Securing means may be the same as shown in Fig. 10 and are similarly indicated.

A pair of ears 101 are struck down from the plate 100 and pivoted to them, as at 102, is the latch member generally indicated as 103, which includes side plates 104 connected by a transversely extending member 105, ridged or offset as at 106 for reinforcing purposes. One of the members 104 has an offset lug or arm 107, which is formed with a lug 108 having an eye or aperture 109 adapted to receive the member 87 with its abutment 89.

A spring 110 normally holds the latch in locking position, the spring being secured at one end to an edge of the plate 100 and at another to an eyelet lug 111 on the arm 107.

112 is the latch member proper, which may be struck out of the same piece of metal as forms the rest of the latch. It has a lower arcuate face 113 and an upper, preferably inclined, face 114, aligned with the aperture 115 of the plate 100. It will be understood that when the closure is dropped into position, the stirrup 29, 30 overrides the inclined surface 114 of the latch member 112 and forces it, against the pull of the spring 110, into unlocking position. As soon as the bottom of the stirrup 29, 30 passes beyond the lower end of the inclined face 114, the spring 110 is effective to snap the latch back into locking position.

The corners of the side plates 104 serve as abutments to limit the movement of the latch in the locking direction, the parts being shown at the limit of the locking position in Fig. 15, and in the unlocked position in Fig. 17.

It will be observed that the entire latch assembly may be struck from one piece of metal.

Roughly cruciform reinforcement 120 is struck from plate 100 around the aperture 115.

Referring to Fig. 19, I illustrate a latch which is a variant of the form shown in Figs. 6 and 7. The latch member proper 130 is pivoted as at 131 to the plate 6a. A spring 132 tends normally to move the nose 133 to the latching position. It will be understood that the nose 133 is beveled in general conformity to the nose 54 of the form of Fig. 7. The nose, however, extends into the aperture 7a from the front end of the car instead of from the rear, as is the case in Fig. 6.

In order to actuate the latch from adjacent the driver's seat, I provide a flexible cable or wire 134, housed in any suitable conduit 135, preferably flexible so that it can be positioned at any desired point and may be extended along any desired path whereby actuation of any suitable control handle mounted on or near the instrument panel may be employed to move the latch into unlocking position. The control handle corresponds to the control handle 21 of Fig. 1, but it is not thought necessary to make an additional showing thereof.

When the closure is dropped into closing position, the stirrup 29 penetrates the aperture 7a and overrides the inclined nose 133 of the latch 130 and forces it rearwardly against the spring 132. Preferably the latch is connected to the cable 134 for example by a lug 136, which may be apertured in any suitable fashion to permit the latch to rotate into unlocking position without affecting the position of the cable 134 or of the handle 21. In order further to guide and support the latch structure, I provide a generally arcuate slot 137 in the plate 6a, which receives any suitable headed member 138 secured to the latch structure.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. For example, whereas I have shown a U-shaped yoke, it will be understood that I may employ yokes or stirrups of varying shapes, sizes and materials.

Where I employ the term "transverse," I wish it to be interpreted with sufficient breadth to include lateral plane adjustments in any direction either in the plane of the plates or parallel thereto.

Where I employ the term "aperture," I do not wish to be limited to a completely closed aperture entirely surrounding the keeper, as my guiding effect may under some circumstances be obtained by the employment of an aperture the walls of which do not completely surround the keeper. What is of primary importance is that such an aperture have opposite sides whereby the guiding or centering effect of the keeper may be obtained.

The use and operation of my invention are as follows:

Referring for example to the form of Figs. 1 and following, I provide a compact unitary structure for carrying a lock or latch which holds the closure 2 in final locked position, an additional latch 41 which permits a limited upward movement of the closure 2, and a spring 34 which, through the pin 35 and the plate 37, tends yieldingly to lift the closure 2 to the upward limit of movement permitted by the hook portion 42 of the latch 41. Normally it need not raise the closure to the full limit of the latch 41, but if the closure 2 happens to be blown open during the movement of the car, the hood 42 positively limits the upward movement of the closure 2.

The main latch 14 cannot be actuated from the exterior of the hood except by the actuation of the operating handle 21 inside the car itself. Assume that the operator wishes to give a filling station attendant access to the engine, he may pull on or otherwise actuate the handle 21, with the result that the latch 14 is withdrawn to released position. The spring 34 then lifts the closure 2 a distance which cannot exceed the full length of the hook 41, 42, but which in practice will be only a fraction of the possible lift. However, this lift is in practice sufficient to permit the operator to insert his fingers under the forward end of the hood closure 2 in order to complete the lifting of the closure.

The member 46 is conveniently located and is conveniently shaped to receive the hand or fingers of the operator so that the operator, by a single unitary upward lift, moves the hook 42 to release position and lifts the closure 2 to any desired height. It will be understood that any suitable means may be employed, not herein shown, for holding the closure 2 in upward position when it once has been lifted.

In the operation of the device, the yoke 29 serves the unitary purpose of guiding the closure 2 into proper position in relation to the hood 1. For initial adjustment, the plate 6 may be laterally adjusted and the plate 22 may be longitudinally adjusted. The rounded corners 30 of the yoke 29 serve as centering means for centering the hood 2 in proper position when it is downwardly moved. There is a very slight transverse clearance between the yoke 29 and the inner faces of the aperture 7. There is, however, a substantial longitudinal clearance to permit tilting.

The lower end of yoke 29 further serves as a keeper to receive the bottom face 14b of the member 14. In practice it can be straight but slight inclination may be helpful. The inclined faces 14a permit the yoke 29 to override the latch 14 against the action of the spring 17. As soon as the yoke clears the bottom of the latch 14, the spring 17 is effective to move it into the latching position.

Normally the closure 2 is thus firmly locked. There is always, however, a possibility that the operator may not move the closure down quite far enough to obtain a complete locking effect. In this event, the latch hook 42 is effective since the spring 45 keeps it at all times in vertical alinement with that portion of the flange 13 which extends along the locking lip 12 of the plate 6. Thus, even if the hood closure 2 is lifted by the wind caused by movement of the car, it can only be lifted through an arc sufficient to cause the hook 42 to engage the flange 13 and further unintended upward movement of the hood closure 2 is thus prevented.

Referring to all of the forms herein, the spring plunger including the stem 35 or 35a is effective to keep the parts in rattle-preventing relationship when locked, and is also effective to raise the hood closure when the latching means is released to the extent of the travel of the spring. Any further raising is of course prevented by the safety latch 42, it being understood however that normally the spring will not raise the closure to the full limit of the latch. However, even if the device releases when the vehicle is under way, not even wind pressure would be effective to raise the hood closure higher than the safety latch 42 will permit. It will be noted that in Fig. 4 the structure is unitarily composed with the thrust member 37 guided on the keeper 29 and tending, therefore, to keep the keeper 29 and the latch 14 in firm and rattle-preventing relationship.

Referring to the form of Figs. 9 and following, I provide convenient means for permitting the latch 90 to recede from locking position, to override the downwardly moving keeper or yoke 29, and to snap back into locked position, as shown in Fig. 13, all without disturbing or affecting the location of the member 87 and the control handle 21, and without causing rotation of the shaft 85.

It will be observed also that the adjustment of the yoke 29, made possible by the locknuts 32, enables it to be located in relation to the height of the latch portion 95 of Fig. 13 or of the corresponding latch of any of the other forms.

I claim:

1. In locking means for an automobile hood including hingedly connected members and having a keeper fixed on one hood member and a latch pivoted on the other, control means for rotating said latch from locked to unlocked position, including a lever pivoted concentrically with the latch and a control handle for said lever, yielding means effective normally to urge said lever against said latch and to urge both into locking position, said latch including a camming portion adapted to be engaged by said keeper when the hood closure is lowered to closed position, whereby said latch may rotate to unlocked position against said yielding means, while said lever remains in locking position, and connecting means between said lever and said latch whereby, when said lever is moved toward unlocking position, the latch is constrained to unitary movement therewith.

2. In locking means for an automobile hood, including hingedly connected members, and having a stirrup mounted on one of the hood members, an aligning member mounted on the other hood member and apertured to receive the stirrup, latching means mounted on the aligning member and including a nose adapted to engage the stirrup and be overridden thereby, said latching means including a transversely extending back member having a plate at each end, said plates being pivotally mounted on the apertured aligning member, the latch nose forming part of said back member and being mounted intermediate said plates and being aligned with the aperture of said aligning member, a yielding means tending normally to urge said latch nose to latching position, and means for withdrawing said latch, against said yielding means, to unlatched position.

3. In a hood latching arrangement for a vehicle wherein a movable encasing portion of the hood is adapted to be normally latched in closed position in relation to a fixed portion of the vehicle, guiding means interposed between the movable encasing portion of the hood and the vehicle, including a generally loop-shaped stirrup on one of said members, and an apertured aligning member on the other of said members, adapted to receive said stirrup when the movable encasing portion of the hood is in closed position, and latch means adjacent said apertured aligning member and including a latch portion adapted to penetrate the loop of said stirrup in a locking relationship, and yielding means tending normally to urge said latching means into locking position, said latch portion including an inclined face adapted to be overridden by the stirrup when the encasing portion of the hood is moved toward and into closed position.

4. In locking means for an automobile hood, including hingedly connected members, latch-part mounting members mounted on the respective hood members, one of said mounting members being vertically superposed over the other when the hood is in closed position, one of said mounting members being longitudinally adjustable in relation to the vehicle and the other being transversely adjustable, a combined centering member and keeper mounted on and vertically adjustable in relation to one of said mounting members, the other mounting member being apertured to receive the keeper in guiding relationship, such adjustability of the mounting members providing means whereby the keeper and receiving aperture may be brought into proper registry, latch means mounted on said apertured mounting member, said latch means being adapted to engage said keeper in locking relationship, adjustment of the keeper providing for cooperative registery with the bolt, and means for withdrawing it from latched position, the end of the latch means, when in locking position, projecting into the path of movement of the keeper between open and closed position of the hood members.

5. In locking means for an automobile hood, including hingedly connected members, a plurality of latch-part mounting plates, means for mounting one of said plates on one of the hinged hood members and the other of said plates on the other of said hood members for adjustment transversely with respect to each other, said plates being vertically aligned when the closure is in closed position, a combined centering member and keeper mounted on one of said plates, the other plate being apertured to receive it in guiding relationship, such adjustability of said plates providing means whereby the keeper and receiving aperture may be brought into proper registry, latch means mounted on said apertured plate, said latch means being adapted to engage said keeper in locking relationship, adjustment of the keeper providing for cooperative registry with the bolt, and means for withdrawing it from latched position, the end of the latch means, when in locking position, projecting into the path of movement of the keeper between open and closed position of the hood members.

6. In locking means for an automobile hood, including hingedly connected members, having a latch on one and a keeper on the other, latch-part supporting members on hood members, a closed loop mounted for vertical adjustment in relation to one of said members, an aligning member mounted on the other and apertured to receive said loop, the sides of the loop being adapted to engage opposite sides of the aperture of said aligning member, in a centering relationship, and latch means associated with said aligning member and adapted to penetrate the bend of the loop member, and means for transversely adjusting said supporting members in relation to each other, and for thereby bringing the receiving aperture into proper registry with said loop.

7. In locking means for an automobile hood including hingedly connected hood members, having a latch on one and a keeper on the other, a pair of latch-part mounting plates one on each of said members, means for mounting one of said plates on its hood member for adjustment transversely with respect to the other, a combined centering member and keeper mounted on one of the plates, the other of said plates being apertured to receive it when the hood members are in closed position, such adjustability of the plates providing means whereby the keeper and receiving aperture may be brought into proper registry, said latching means being movably mounted on the under side of the apertured plate, for movement into and out of latching relationship with the keeper, said latching means including a nose portion, and yielding means for biasing the latching means to a position in which the nose portion underlies the aperture in said plate, said nose portion, when in locking position, projecting into the path of movement of the keeper between open and closed position of the hood members, and means for positively moving said nose portion clear of the aperture in the plate and out of the path of movement of the keeper, against the bias of said yielding means.

8. In locking means for an automobile hood including hingedly connected hood members, having a latch on one and a keeper on the other, latch-part mounting members one on each of said members mounted on the respective hood members, one of said mounting members being vertically superposed over the other when the hood is in closed position, means for mounting one of said mounting members for adjustment transversely with respect to the other, a combined centering member and keeper mounted on one of the mounting members, the other of the mounting members being apertured to receive it when the hood members are in closed position, such adjustability of the mounting members providing means whereby the keeper and the receiving aperture therefor may be brought into proper registry, said latching means being movably mounted on the apertured mounting member, for movement into and out of latching relationship with the keeper, yielding means for biasing the latching means normally to latching position, and means for positively moving the latching means to unlatching position, against the bias of said yielding means.

9. In locking means for an automobile hood including hingedly connected hood members, having a latch on one and a keeper on the other, latch-part mounting members one on each of said members mounted on the respective hood members, one of said mounting members being vertically superposed over the other when the hood is in closed position, means for mounting one of said mounting members for adjustment transversely with respect to the other, a combined centering member and keeper mounted on one of the mounting members, the other of the mounting members being apertured to receive it when the hood members are in closed position, such adjustability of the mounting members providing means whereby the keeper and the receiving aperture therefor may be brought into proper registry, said keeper having beveled guiding portions adapted to engage the edges of said aperture, said latching means being movably mounted on the apertured mounting member for movement into and out of latching relationship with the keeper, yielding means for biasing the latching means normally to latching position, said latching means including a beveled portion adapted to permit the keeper to override the latching means when the latching means is in latching position, at the time that the keeper is moved into latching position, means for positively moving the latching means to unlatching position against the bias of said yielding means, and means for adjusting said keeper and for thereby providing for cooperative registry of the keeper with the latching means.

10. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means for adjustably mounting one of said mounting members whereby they may have relative adjustment to provide for proper alignment of said keeper and said aperture.

11. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means for adjustably mounting one of said mounting members whereby they may have relative adjustment to provide for proper alignment of said keeper and said aperture, said keeper being in the form of a loop.

12. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means for adjustably mounting one of said mounting members whereby they may have relative adjustment to provide for proper alignment of said keeper and said aperture, said keeper being in the form of a loop, the aperture of said other mounting member conforming generally in width to the width of said loop, but being of sufficient length along the long axis of the vehicle to permit relative longitudinal adjustment of the two mounting members.

13. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means for adjustably mounting one of said mounting members whereby they may have relative adjustment to provide for proper alignment of said keeper and said aperture, one of said mounting members being mounted for lateral adjustment across the axis of the vehicle, the other being mounted for longitudinal adjustment along the length of the vehicle.

14. In a locking means for an automobile hood including hingedly conneced hood members and having a latch on one such member and a keeper on the other, and a pair of latch-part mounting members, one mounted on one of said hinge members and the other on the other, means for mounting said mounting members for adjustment transversely with respect to each other, said keeper being mounted on one of the mounting members, the other of said mounting members having an aperture to receive said keeper when the hood members are in closed position, such adjustability of the mounting members providing means whereby the keeper and the receiving aperture may be brought into proper registry when the hood proper is in closed position, the latch being mouned on the apertured mounting member and adjacent the aperture and including a portion adapted for latching engagement with said keeper, and yielding means for biasing the latch to position in which it engages the keeper when the keeper penetrates the apertured mounting member.

15. In a locking means for an automobile hood, including hingedly connected members having a latch on one and a keeper on the other, a U-shaped closed loop mounted on one of said members, an aligning member mounted on the other and apertured to receive said loop, said loop having portions adapted to engage the opposite side edges of the aperture of said aligning member, a latch being mounted on said apertured aligning member, and adapted to penetrate the bend of said loop, and yielding means tending normally to urge said latch to latch position, the aperture of said loop being of substantially greater width than the width of the latch which penetrates the loop whereby relative lateral adjustment of the latch and loop is permitted.

ROWLAND HILL.